(12) United States Patent
Kono et al.

(10) Patent No.: US 7,610,748 B2
(45) Date of Patent: Nov. 3, 2009

(54) MOUNTING STRUCTURE FOR AN AIR-FUEL RATIO SENSOR IN A MOTORCYCLE, AND EXHAUST SUBASSEMBLY INCLUDING SAME

(75) Inventors: Tomoya Kono, Saitama (JP); Takeru Abe, Saitama (JP); Ryutaro Yamazaki, Saitama (JP); Mamoru Uraki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 371 days.

(21) Appl. No.: 11/236,683

(22) Filed: Sep. 27, 2005

(65) Prior Publication Data

US 2006/0064964 A1    Mar. 30, 2006

(30) Foreign Application Priority Data

Sep. 30, 2004   (JP) ............................. 2004-286063

(51) Int. Cl.
*F01N 3/00* (2006.01)
(52) U.S. Cl. ............................. 60/276; 60/274; 60/313; 60/323
(58) Field of Classification Search .................. 60/276, 60/277, 305, 311, 312, 313, 323, 324
See application file for complete search history.

(56) References Cited

U.S. PATENT DOCUMENTS

| | | | | |
|---|---|---|---|---|
| 3,847,778 A | * | 11/1974 | Riddel ......................... 204/427 |
| 4,000,614 A | * | 1/1977 | Abthoff et al. ................. 60/276 |
| 4,553,388 A | * | 11/1985 | Okubo et al. ................. 60/276 |
| 5,083,427 A | * | 1/1992 | Anderson ..................... 60/274 |
| 5,271,477 A | * | 12/1993 | Gekka et al. ................. 180/219 |
| 5,271,480 A | * | 12/1993 | Takegami .................... 180/309 |
| 5,867,985 A | * | 2/1999 | Furuhashi et al. ............. 60/323 |
| 5,911,609 A | | 6/1999 | Fujimoto et al. |
| 6,082,103 A | * | 7/2000 | Sugiura et al. ................. 60/323 |
| 6,745,561 B2 | * | 6/2004 | Kim ............................. 60/323 |

FOREIGN PATENT DOCUMENTS

| | | | | |
|---|---|---|---|---|
| DE | 3721810 | 1/1989 | | |
| DE | 10320247 | 11/2003 | | |
| EP | 0500105 | 8/1992 | | |
| JP | 358155214 A | * 9/1983 | ................ | 60/323 |
| JP | 59-074360 | 4/1984 | | |
| JP | 59099021 | 6/1984 | | |
| JP | 59110825 | 6/1984 | | |
| JP | 11343895 | 12/1999 | | |
| JP | 2000-335467 | 12/2000 | | |
| JP | 02005220814 A | * 8/2005 | ................ | 60/323 |

* cited by examiner

*Primary Examiner*—Binh Q Tran
(74) *Attorney, Agent, or Firm*—Carrier, Blackman & Associates, P.C.; William D. Blackman; Joseph P. Carrier (57) ABSTRACT

A mounting structure is provided for an air-fuel ratio sensor on an exhaust pipe in a motorcycle in which a concentration of oxygen in an exhaust gas can be detected efficiently and accurately by the air-fuel ratio sensor. The air-fuel ratio sensor is mounted on a convergent connector of exhaust pipes, which, in turn, are operatively connected to the cylinders of a multi-cylinder engine. The air-fuel ratio sensor is located upstream of catalytic converters provided in the exhaust pipes, and may be mounted so as to be oriented substantially vertically when the motorcycle is in an upright configuration, or alternatively, may be inclined toward the rear of the motorcycle.

16 Claims, 7 Drawing Sheets

MOUNTING STRUCTURE FOR AN AIR-FUEL RATIO SENSOR IN A MOTORCYCLE, AND EXHAUST SUBASSEMBLY INCLUDING SAME

CROSS-REFERENCE TO RELATED APPLICATIONS

The present invention claims priority under 35 USC 119 based on Japanese patent application No. 2004-286063, filed on Sep. 30, 2004. The subject matter of this priority document is incorporated by reference herein.

BACKGROUND OF THE INVENTION

1. Field of the Invention

The present invention relates to an air-fuel ratio sensor, to a structure for mounting the sensor to an exhaust system component of a motorcycle, and to an exhaust subassembly incorporating the sensor. More particularly, the present invention relates to a mounting structure for affixing an air-fuel ratio sensor to an exhaust pipe in a motorcycle, and to a related exhaust subassembly including the sensor, the mounting structure, and the exhaust pipe.

2. Background Art

It is well known to employ an oxygen sensor in a motorcycle exhaust system, so as to improve the catalytic efficiency thereof. In a motorcycle having a multi-cylinder engine, such an oxygen sensor is typically mounted on a convergent connector of exhaust pipes at a position upstream of a catalytic converter and spaced apart from the engine on the rear lower side thereof. The catalytic converter is used for exhaust purification, for example, and may comprise a three-way catalyst. In a motorcycle having a single-cylinder engine, such an oxygen sensor is located in an empty space, the space selected such that the sensor does not interfere with the engine body. This position improves the maintainability of the sensor and protects the sensor.

Related to this mounting structure, there has been proposed an invention entitled "Air-Fuel Ratio Control Device for Internal Combustion Engine" (Japanese Laid-open Patent No. Sho 59-74360). In Japanese Laid-open Patent No. Sho 59-74360, a catalyst for exhaust purification is provided in an exhaust pipe of an internal combustion engine for a vehicle, and an exhaust gas sensor is mounted upstream of the catalyst. The composition of an exhaust gas to be supplied to the catalyst is detected by the exhaust gas sensor, and the air-fuel ratio for an air-fuel mixture to be taken into the engine is controlled according to a detection signal output from the exhaust gas sensor. According to the description in Japanese Laid-open Patent No. Sho 59-74360, feedback control of such an air-fuel ratio is performed by a known air-fuel ratio control device, so that the composition of the exhaust gas is optimized, allowing best purification of the exhaust gas by the catalyst. Further, Japanese Laid-open Patent No. Sho 59-74360 also discloses that an oxygen sensor for detecting the concentration of oxygen in an exhaust gas is generally used as the exhaust gas sensor.

Further, according to the description in an invention entitled "Exhaust Gas Sensor Device in Motorcycle" (Japanese Laid-open Patent No. 2000-335467), an exhaust gas sensor, for detecting the concentration of oxygen or the like in an exhaust gas discharged from an engine mounted on a motorcycle, may be mounted on an upper wall of an exhaust pipe at a position on the front side of a right projecting portion of a crankcase, and on the outer side of a right side surface of a cylinder block.

In both of the references cited above, an oxygen sensor is used as the exhaust gas sensor. This kind of oxygen sensor determines whether the air-fuel ratio is rich or lean with respect to a stoichiometric air-fuel ratio in a narrow region near the stoichiometric air-fuel ratio, but it is not suitable for linear detection of the oxygen concentration over a wide range of values.

Also in a motorcycle, it is desirable to detect the air-fuel ratio in a wide region by using an air-fuel ratio sensor in place of the oxygen sensor mentioned above. In other words, the oxygen sensor merely detects the presence or absence of oxygen in an exhaust gas as mentioned above, whereas the air-fuel ratio sensor can linearly detect the oxygen concentration in an exhaust gas over a wide range by using an element whose output voltage changes in proportion to the oxygen concentration. However, since the air-fuel ratio sensor detects the oxygen concentration over a wide range rather than in a narrow region near the stoichiometric air-fuel ratio as mentioned above, the detection accuracy of the air-fuel ratio sensor may be affected significantly by the location of the air-fuel ratio sensor.

Accordingly, it is an object of the present invention to provide a mounting structure for an air-fuel ratio sensor on a motorcycle, wherein the concentration of oxygen or the like can be efficiently and accurately detected by the air-fuel ratio sensor.

SUMMARY OF THE INVENTION

According to a first aspect of the present invention, a mounting structure is provided for an air-fuel ratio sensor in a motorcycle having a multi-cylinder engine, where the sensor is used for detecting the concentration of oxygen in the exhaust gas of the motorcycle. In the structure according to the first aspect hereof, the air-fuel ratio sensor is mounted on at least one of a plurality of exhaust pipes connected to the cylinders of the engine.

With this arrangement, the concentration of oxygen in the exhaust gas passing through the plural exhaust pipes can be detected by a minimum number of air-fuel ratio sensors. Preferably, the air-fuel ratio sensor is located upstream of one or more catalytic converter(s) provided in the exhaust pipes, thereby allowing control of the air-fuel ratio such that the combustion efficiency can be improved, and the effectiveness of the catalytic converters can be promoted. The air-fuel ratio sensor may be mounted on an inclined surface of the convergent connector, so as to be inclined towards the rear of the motorcycle. With this arrangement, the amount of inward projection of the air-fuel ratio sensor can be reduced, to thereby provide adequate space for the flow of exhaust gas.

According to the present invention, the concentration of oxygen in the exhaust gas can be efficiently and accurately detected by using a necessary and sufficient number of air-fuel ratio sensors in accordance with a number of variables, including various types of engines, the number of cylinders, the number of exhaust pipes, etc. Moreover, it is possible to perform air-fuel ratio control, such that the effectiveness of the catalytic converters can be promoted.

For a more complete understanding of the present invention, the reader is referred to the following detailed description section, which should be read in conjunction with the accompanying drawings. Throughout the following drawings and description, like numbers refer to like parts. The above-mentioned object, other objects, characteristics and advantages of the present invention will become apparent form the detailed description of the embodiment of the invention presented below in conjunction with the attached drawings.

DETAILED DESCRIPTION OF THE INVENTION

A number of selected illustrative embodiments of the mounting structure of the air-fuel ratio sensor in the motorcycle according to the present invention will now be described in detail with reference to FIGS. 1 to 7. These embodiments are intended to illustrate, rather than to limit the invention. It should be understood that only structures considered necessary for clarifying the present invention are described herein. Other conventional structures, and those of ancillary and auxiliary components of the system, are assumed to be known and understood by those skilled in the art.

Figure 1:
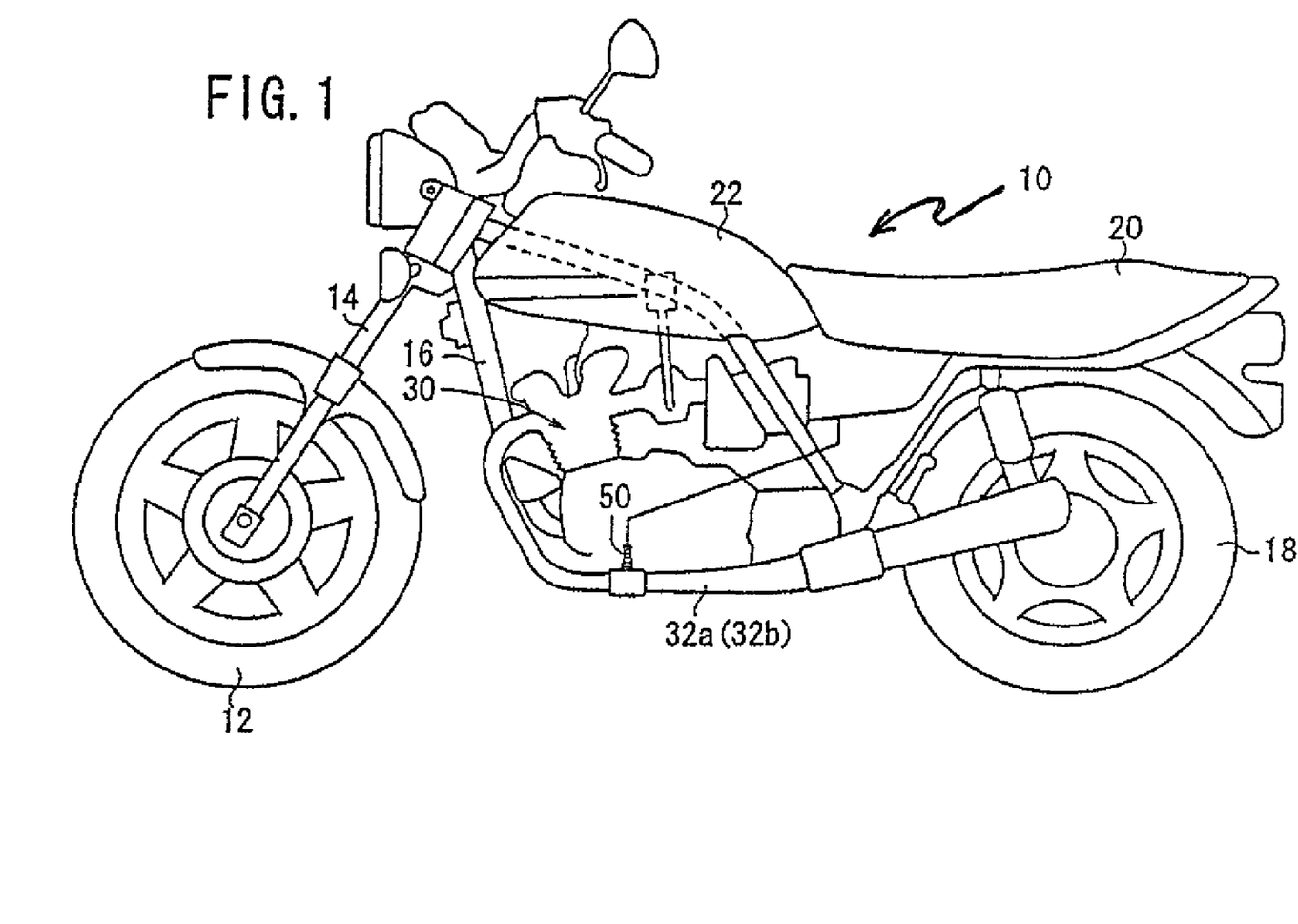
FIG. 1 is a simplified side plan view of a motorcycle having a two-cylinder engine and including an air-fuel ratio sensor mounted according to a first illustrative embodiment of the present invention, where the air-fuel ratio sensor is mounted on a medial connector joining two exhaust pipes.

FIG. 1 is a simplified side plan view of a motorcycle 10 having an air-fuel ratio sensor 50, according to a first illustrative embodiment of the present invention, mounted on a convergent connector located medially in the exhaust system, at a junction between two exhaust pipes. The motorcycle 10 itself has a known structure. More specifically, a front wheel 12 is supported to a front fork 14. The front fork 14 is connected to a frame 16. A rear wheel 18 is provided at a rear portion of the frame 16. A seat 20 is fixed to the frame 16 at a position above the rear wheel 18. A fuel tank 22 is also fixed to the frame 16. A two-cylinder engine 30 is provided below the fuel tank 22. A first exhaust pipe 32a and a second exhaust pipe 32b extend from the two cylinders of the engine 30 toward the rear side of the vehicle, respectively.

Figure 2:
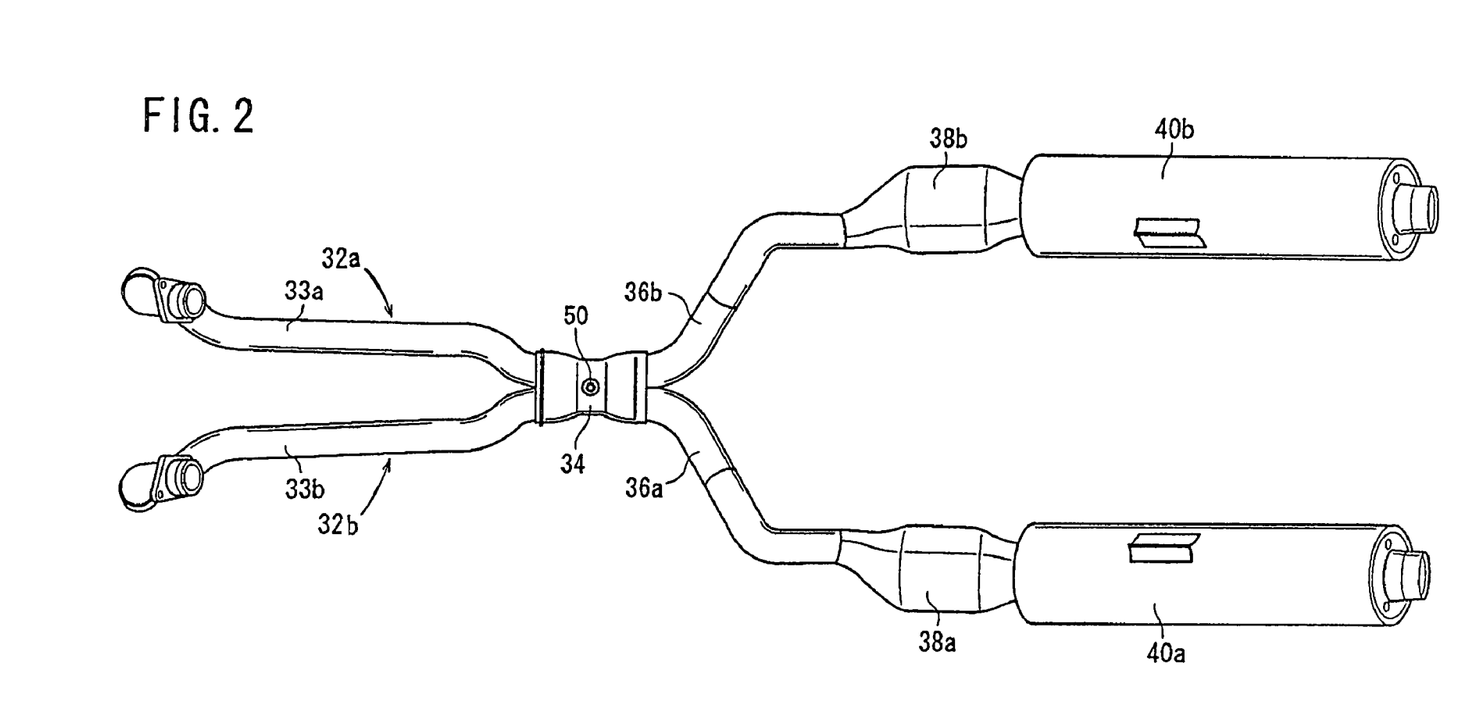
FIG. 2 is a top plan view of the isolated exhaust system which is a component of the motorcycle of FIG. 1, including a sensor mounting structure according to the first illustrative embodiment of the invention, showing the layout of the medial connector and the air-fuel ratio sensor.

FIG. 2 is a top plan view showing the structure of the first and second exhaust pipes 32a and 32b, shown removed from the motorcycle 10 for purposes of clarity. The first exhaust pipe 32a includes an upstream pipe member 33a and a downstream pipe member 36a. Similarly, the second exhaust pipe 32b includes an upstream pipe member 33b and a downstream pipe member 36b. The upstream pipe members 33a and 33b extend from the two cylinders of the engine 30 and are joined to each other to form a convergent connector 34. The convergent connector 34 is branched outwardly at its downstream end, to form the downstream pipe members 36a and 36b. The downstream pipe members 36a and 36b are provided with a first catalytic converter 38a and a second catalytic converter 38b, respectively. The first catalytic converter 38a is connected at its downstream end to a first muffler 40a, and the second catalytic converter 38b is connected at its downstream end to a second muffler 40b. Each of the first and second catalytic converters 38a and 38b includes a three-way catalyst (not shown).

Figure 3:
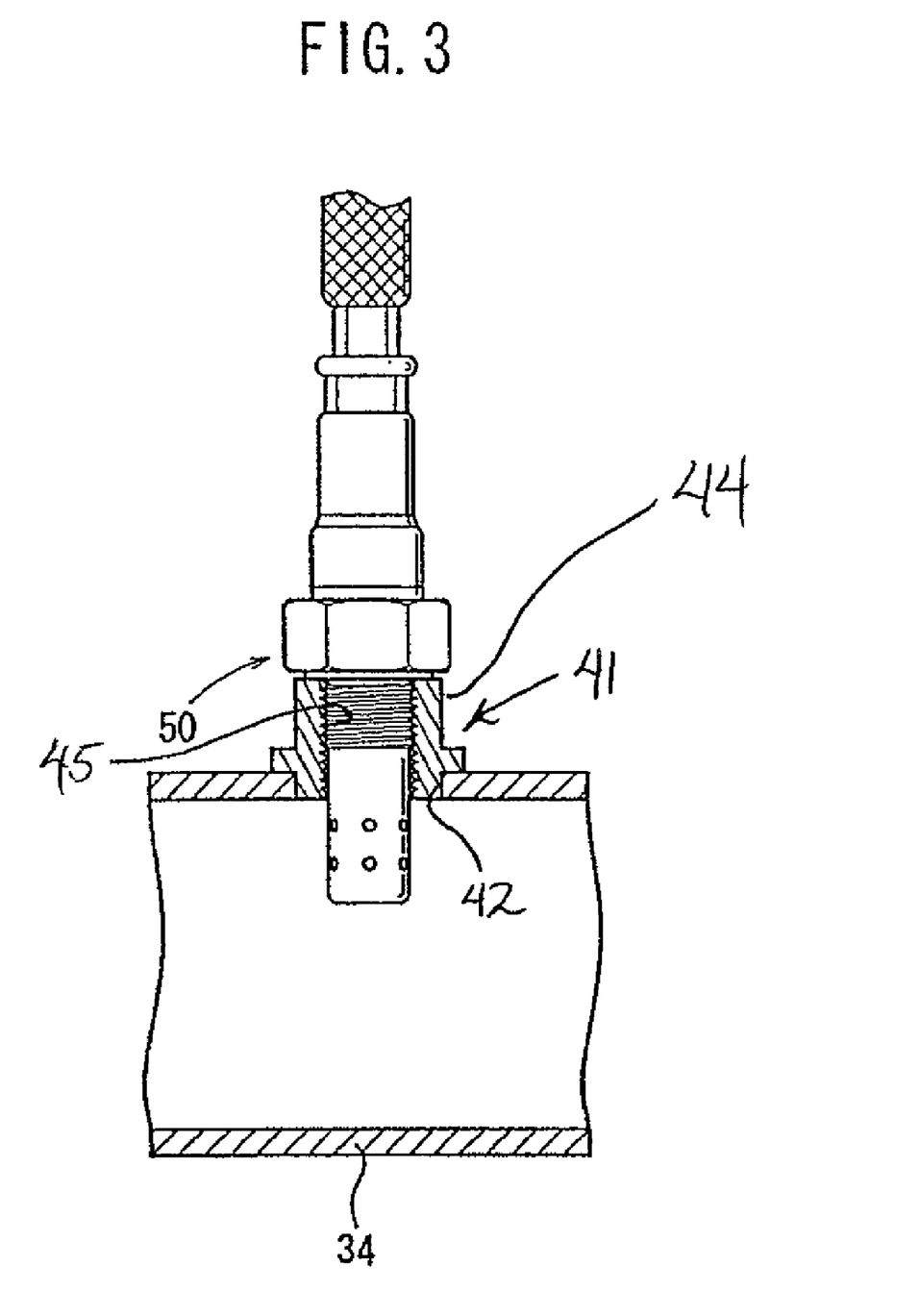
FIG. 3 is a vertical sectional view showing the air-fuel ratio sensor shown in FIGS. 1-2, shown mounted substantially vertically in an upper surface of an exhaust connector.

As shown in FIGS. 2 and 3, an air-fuel ratio sensor 50 is mounted on the convergent connector 34, at a substantially central position on the connector in the longitudinal direction thereof. The sensor 50 is oriented on the convergent connector 34 so as to be pointed in a substantially vertical direction, which will normally be perpendicular to a road surface (not shown) when the motorcycle 10 is upright and/or traveling straight ahead. That is, the air-fuel ratio sensor 50 is mounted to the convergent connector 34 so that a central axis thereof is pointed in a substantially vertical orientation when the vehicle is upright.

During operation of the motorcycle, exhaust gas discharged from the cylinders of the engine 30 is introduced into the upstream pipe members 33a, 33b of the first and second exhaust pipes 32a, 32b, respectively. The exhaust gas passing through these upstream pipe members 33a and 33b is introduced into the convergent connector 34, and the concentration of oxygen in the exhaust gas is linearly detected by the air-fuel ratio sensor 50 mounted on the convergent connector 34. In the depicted embodiment, the air-fuel sensor 50 includes an element whose output voltage changes in proportion to the oxygen concentration. The detected oxygen concentration is converted into an electrical signal, which is in turn supplied to a control unit (not shown) to provide feedback to, and assist the control unit in regulating the air-fuel ratio in the engine 30.

The exhaust gas passing through the convergent connector 34 flows subsequently downstream, and is introduced into the first and second catalytic converters 38a and 38b, which oxidize hydrocarbons (HC) and carbon monoxide (CO), and reduce nitrogen oxides (NOx). Thereafter, the treated exhaust gas is discharged through the mufflers 40a and 40b, to the outside of the vehicle. Accordingly, it is possible to control the air-fuel ratio so as to permit a high combustion efficiency and a sufficient catalytic function in the first and second catalytic converters 38a and 38b.

As shown in FIG. 3, which is a cross sectional view of the convergent connector 34 at a position where the air-fuel ratio sensor 50 is mounted, the convergent connector 34 has a tubular center section formed with a nut 41 affixed thereto in a suitable opening 42 formed in a side wall thereof to receive the nut. This opening 42 may be threaded internally, if desired, to permit removal and replacement of the nut 41. The nut 41 includes a cylindrical collar 44 with a threaded sensor mounting hole 45 formed therein, as shown, for receiving and mounting the air-fuel ratio sensor 50. The sensor mounting hole 45 has an axis inclined substantially vertically, when the motorcycle is in an upright orientation thereof. In an alternative equivalent structure, the nut 41 may be replaced with a reinforced boss (not shown) which is welded on to convergent connector 34, which is integral therewith, and which has threads formed internally therein.

In this first illustrative embodiment, the air-fuel ratio sensor 50 is mounted on the convergent connector 34 of the two exhaust pipes 32a and 32b at a position downstream of the two-cylinder engine 30 and upstream of the first and second catalytic converters 38a and 38b. Accordingly, the required installation space for the air-fuel ratio sensor 50 is not large. Moreover, the air-fuel ratio can be controlled by a minimum number of air-fuel ratio sensors, that is, by the single air-fuel ratio sensor 50, irrespective of the number of cylinders. Further, since the air-fuel ratio sensor 50 is located upstream of the first and second catalytic converters 38a and 38b, an efficient air-fuel ratio can be given to improve efficiency of the three-way catalyst.

Figure 4:
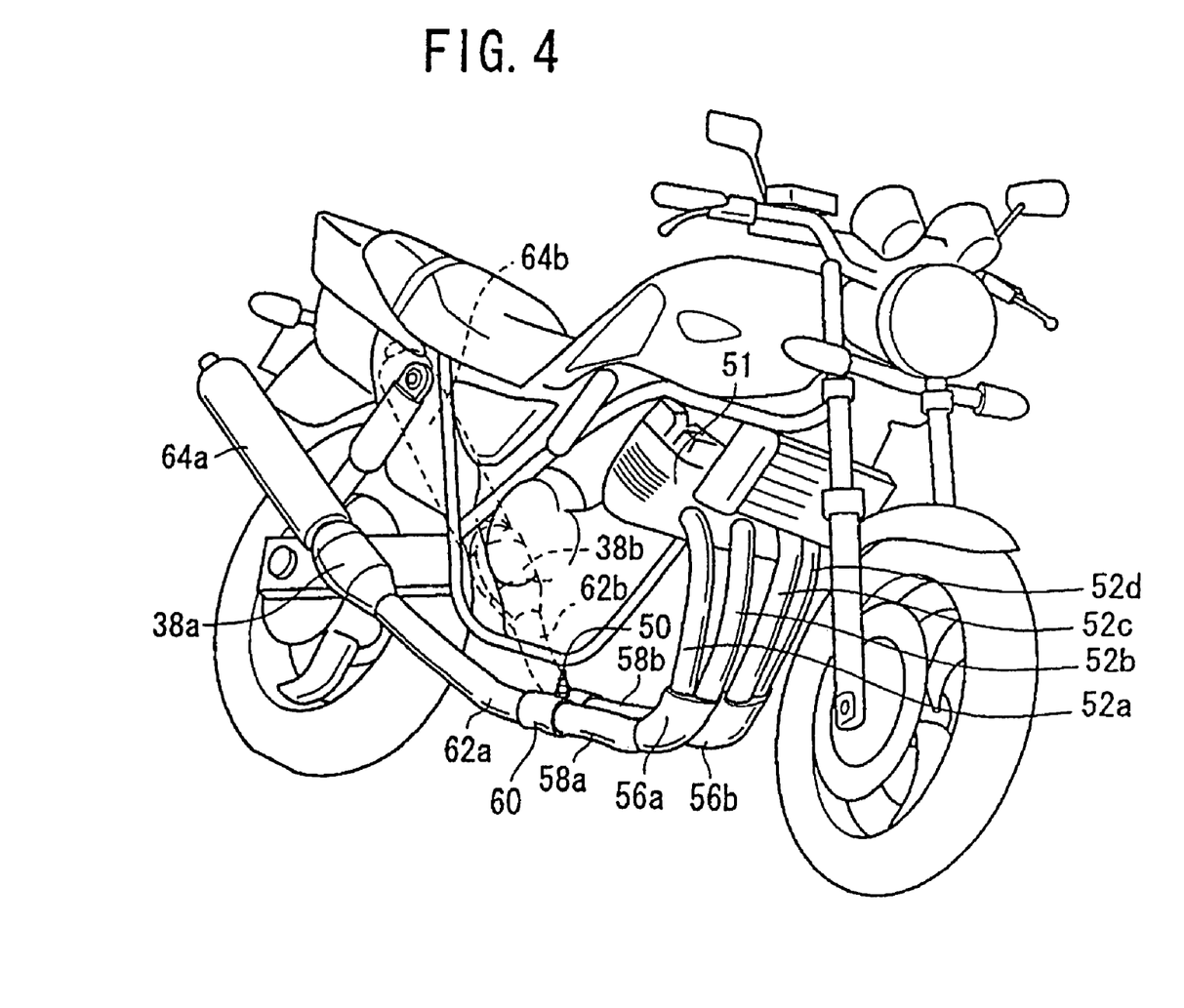
FIG. 4 is a perspective view of a motorcycle having a four-cylinder engine and including an air-fuel ratio sensor according to a second illustrative embodiment of the present invention, where the air-fuel ratio sensor is mounted on a medial connector for four exhaust pipes.
Figure 5:
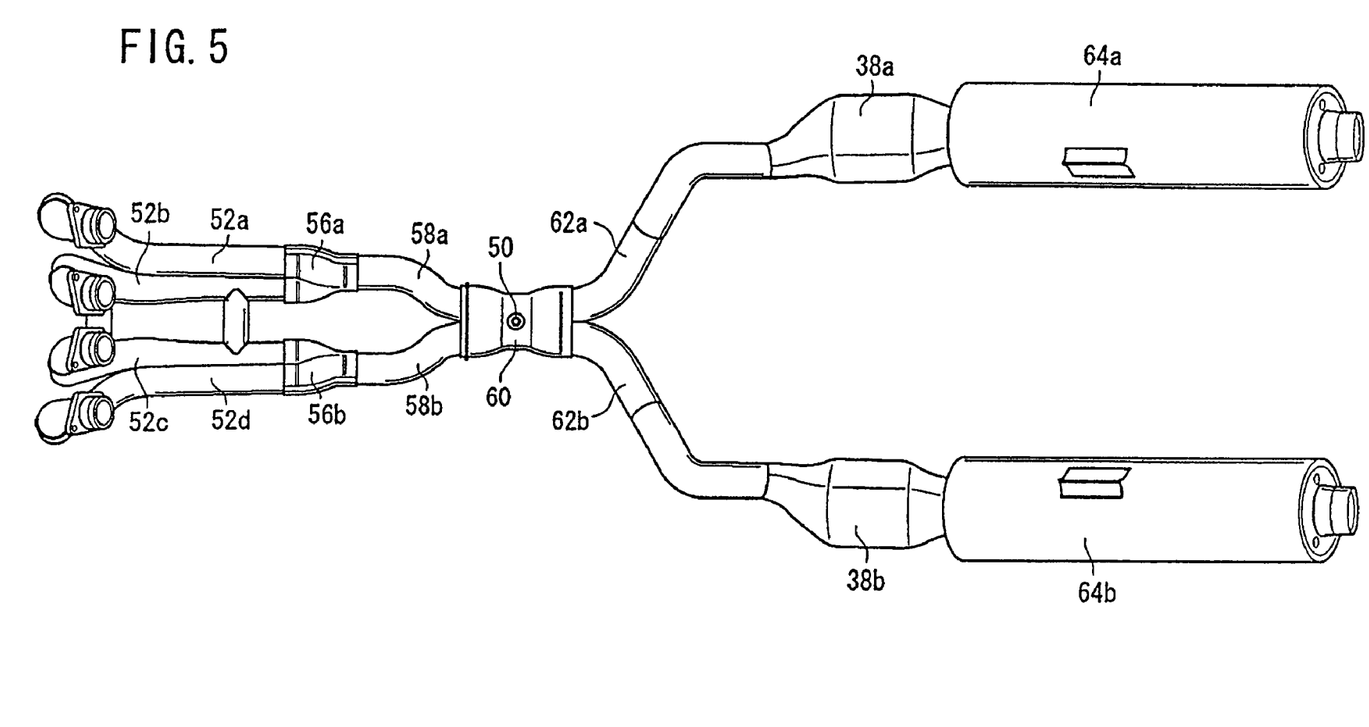
FIG. 5 is a top plan view showing the exhaust system of the motorcycle of FIG. 4, showing the layout of the medial connector and the air-fuel ratio sensor.

FIGS. 4 and 5 show a second illustrative embodiment of the present invention. In FIGS. 4 and 5, the same reference numerals as those shown in FIGS. 1 to 3 will be used to denote the same or similar parts, and the detailed description thereof will be omitted. The same applies to the other illustrative embodiments of the present invention.

The second illustrative embodiment relates to a motorcycle having a four-cylinder engine 51. A first exhaust pipe 52a is connected to the first cylinder of the engine 51, and a second exhaust pipe 52b is connected to the second cylinder of the engine 51. As seen best in FIG. 5, the first exhaust pipe 52a and the second exhaust pipe 52b are connected through a first junction member 56a to a first intermediate pipe 58a. Similarly, a third exhaust pipe 52c is connected to the third cylinder of the engine 51, and a fourth exhaust pipe 52d is connected to the fourth cylinder of the engine 51. The third exhaust pipe 52c and the fourth exhaust pipe 52d are connected through a second junction member 56b to a second intermediate pipe 58b.

The first intermediate pipe 58a and the second intermediate pipe 58b are joined to each other at a central convergent connector 60. The central convergent connector 60 has a similar structure to that of the convergent connector 34 according to the first embodiment, as described herein and as shown in FIG. 3. The central convergent connector 60 is branched at its downstream end, to form a right down pipe 62a and a left down pipe 62b. The right down pipe 62a and the left down pipe 62b are connected, at their respective downstream ends, to a first catalytic converter 38a and a second catalytic converter 38b, respectively.

In FIGS. 4 and 5, reference numerals 64a and 64b denote first and second mufflers, respectively.

In the second illustrative embodiment, an air-fuel ratio sensor 50 is mounted on the central convergent connector 60. The exhaust gas discharged from the first and second exhaust pipes 52a and 52b passes through the first junction member 56a and the first intermediate pipe 58a to reach the central convergent connector 60. Similarly, the exhaust gas discharged from the third and fourth exhaust pipes 52c and 52d passes through the second junction member 56b and the second intermediate pipe 58b to reach the central convergent connector 60.

The concentration of oxygen in the exhaust gas is detected by the air-fuel ratio sensor 50 mounted on the central convergent connector 60. As in the first illustrative embodiment, the oxygen concentration detected above is converted into an electrical signal to control the air-fuel ratio in the four-cylinder engine 51.

Also in the second illustrative embodiment shown in FIGS. 4 and 5, the exhaust gas discharged from the four cylinders of the engine 51 is detected by the single air-fuel ratio sensor 50 to control the air-fuel ratio in the engine 51.

Thus, the air-fuel ratio sensor 50 is efficiently located with respect to the four cylinders to thereby allow the air-fuel ratio control with a minimum number of sensors. Furthermore, since the air-fuel ratio sensor 50 is located upstream of the first and second catalytic converters 38a and 38b, an efficient air-fuel ratio can be provided to the three-way catalyst.

Figure 6:
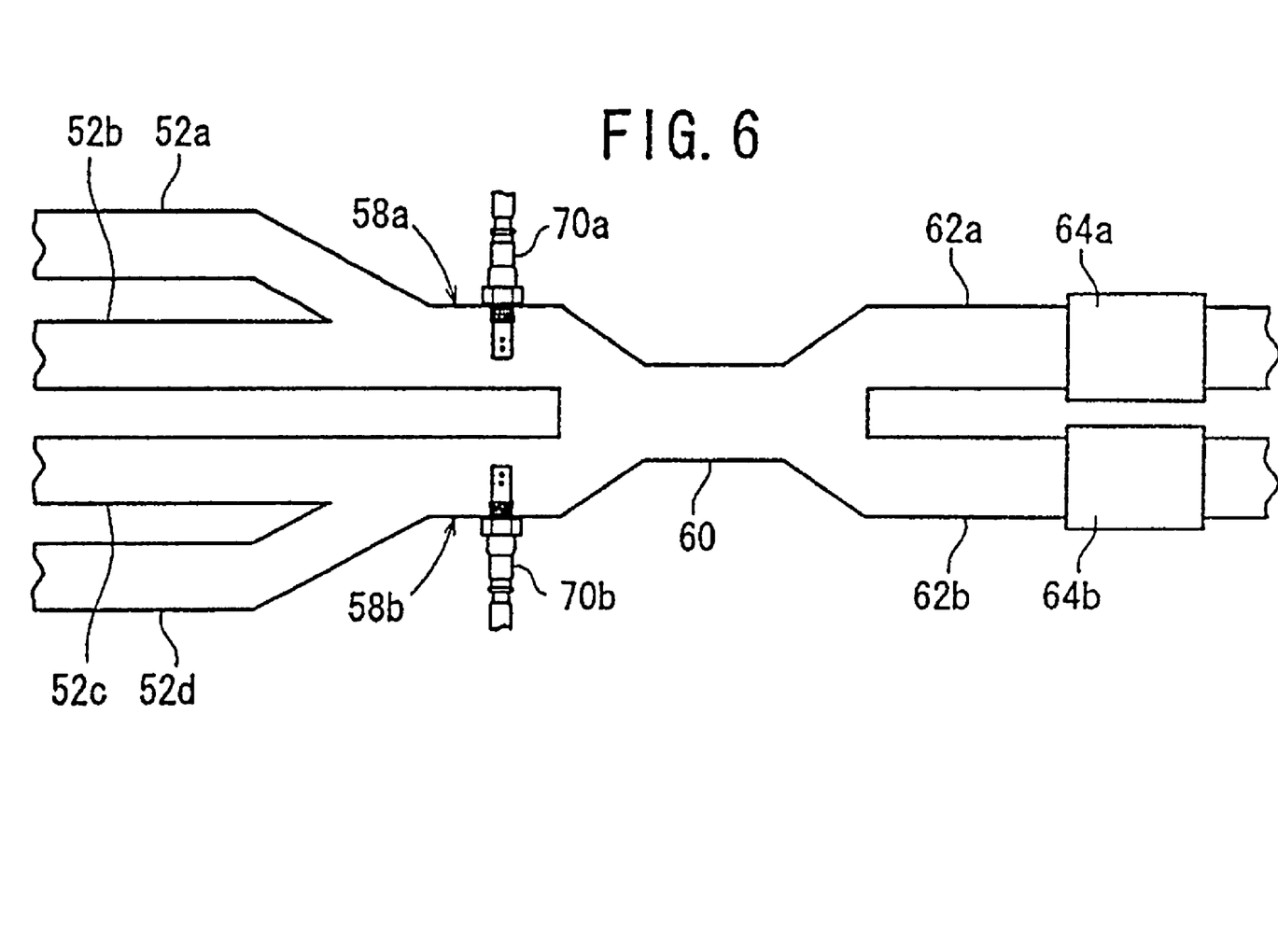
FIG. 6 is a schematic plan view showing a third illustrative embodiment of the present invention wherein first and second air-fuel ratio sensors are mounted on first and second upstream connectors of four exhaust pipes in a four-cylinder engine, respectively.

FIG. 6 shows a third illustrative embodiment of the present invention. FIG. 6 is a schematic illustration of a modified layout of exhaust pipes, catalytic converters, and air-fuel ratio sensors, based on the general configuration shown in FIG. 5.

That is, the third illustrative embodiment shown in FIG. 6 is different from the second illustrative embodiment shown in FIG. 5, only in that the single air-fuel sensor of FIG. 5 is replaced by a pair of air-fuel sensors. In the embodiment of FIG. 6, a first air-fuel ratio sensor 70a is mounted on the first intermediate pipe 58a, and a second air-fuel ratio sensor 70b is mounted on the second intermediate pipe 58b. Accordingly, the first air-fuel ratio sensor 70a is used to detect the concentration of oxygen in the exhaust gas passed through the first and second exhaust pipes 52a and 52b, respectively, connected to the first and second cylinders of a four-cylinder engine. Similarly, the second air-fuel ratio sensor 70b is used to detect the concentration of oxygen in the exhaust gas passed through the third and fourth exhaust pipes 52c and 52d, respectively, connected to the third and fourth cylinders of the four-cylinder engine.

According to this illustrative embodiment, the oxygen concentration in the first and second exhaust pipes 52a and 52b can be detected by the first air-fuel ratio sensor 70a, and the oxygen concentration in the third and fourth exhaust pipes 52c and 52d can be detected by the second air-fuel ratio sensor 70b. Accordingly, the air-fuel ratio in each cylinder of the four-cylinder engine can be controlled more accurately, and a problem condition, such as a leaky injector, can be diagnosed and located more easily than it could be with only a single air-fuel sensor.

Figure 7:
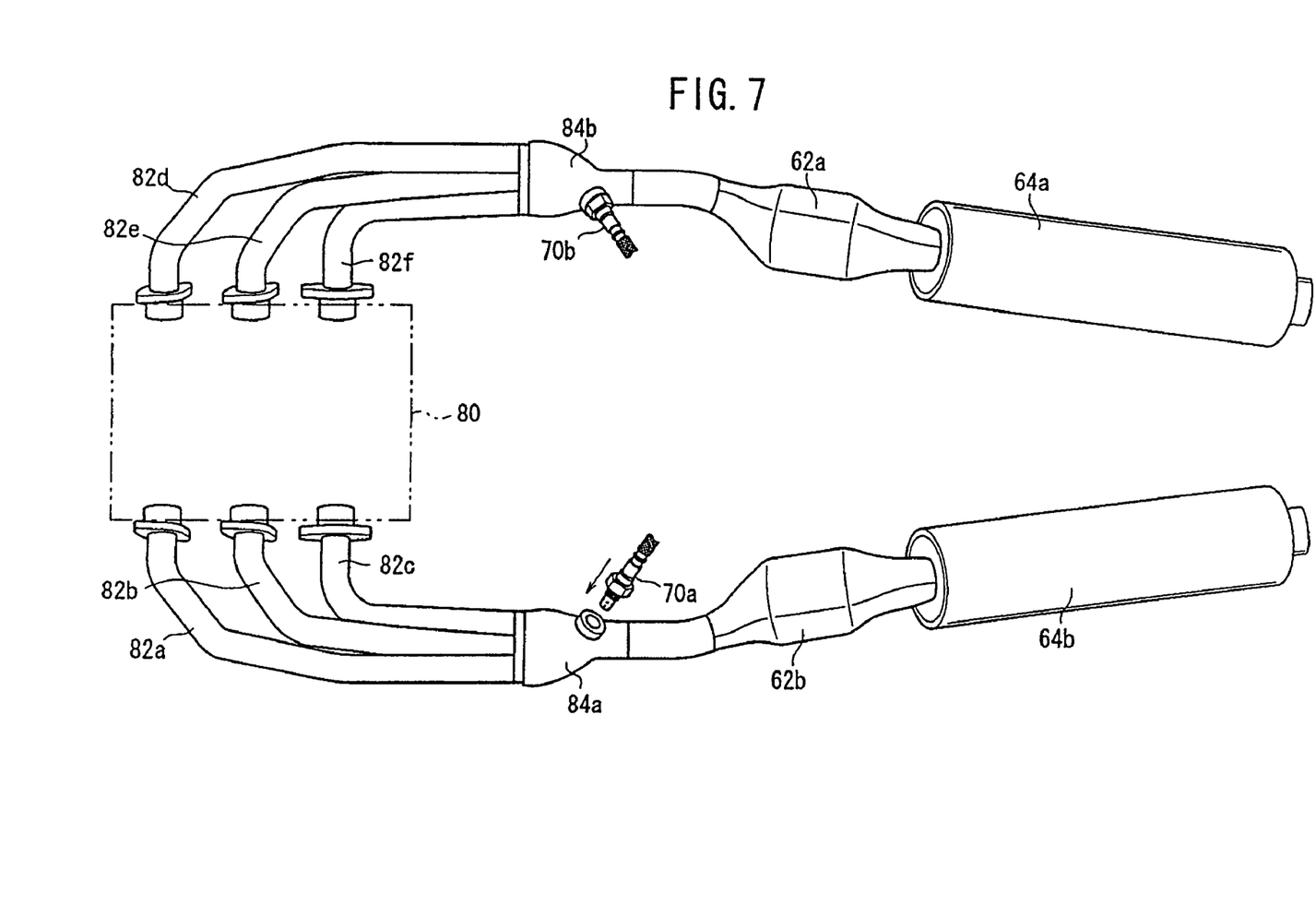
FIG. 7 is a schematic plan view of an exhaust system for a horizontally opposed six-cylinder engine showing a fourth illustrative embodiment of the present invention wherein a first air-fuel ratio sensor is mounted on a first convergent connector of three exhaust pipes connected to three cylinders of the six-cylinder engine on one side thereof, and a second air-fuel ratio sensor is mounted on a second convergent connector of three exhaust pipes connected to the remaining three cylinders of the engine on the other side thereof.

FIG. 7 shows a fourth illustrative embodiment of the present invention. In the illustrative embodiment depicted in FIG. 7, a horizontally opposed six-cylinder engine 80 is used, and two air-fuel ratio sensors 70a and 70b are provided to control the air-fuel ratio in the engine 80.

As shown in FIG. 7, a first exhaust pipe 82a, a second exhaust pipe 82b, and a third exhaust pipe 82c, on the left side of the engine 80, are joined together at a first convergent connector 84a. Similarly, a fourth exhaust pipe 82d, a fifth exhaust pipe 82e, and a sixth exhaust pipe 82f, on the right side of the engine 80, are joined together at a second convergent connector 84b.

The first air-fuel ratio sensor 70a is mounted on the inner inclined surface of the first convergent connector 84a so as to be inclined upwardly and toward the rear of the vehicle. Similarly, the second air-fuel ratio sensor 70b is mounted on the inner inclined surface of the second convergent connector 84b so as to be inclined upwardly and toward the rear of the vehicle. With this arrangement, the concentration of oxygen in the exhaust gas passed through the first, second, and third exhaust pipes 82a, 82b, and 82c can be detected by the first air-fuel ratio sensor 70a, mounted on the first convergent connector 84a. The concentration of oxygen in the exhaust gas passed through the fourth, fifth, and sixth exhaust pipes 82d, 82e, and 82f can be detected by the second air-fuel ratio sensor 70b, mounted on the second convergent connector 84b.

Also in this illustrative embodiment, the concentration of oxygen in the exhaust gas passed through a plurality of exhaust pipes can be detected by a minimum number of air-fuel ratio sensors. Particularly in the case of the horizontally opposed six-cylinder engine 80, the concentration of oxygen in the exhaust gas discharged from the first to third cylinders of the engine 80, on one side thereof, can be detected by the single air-fuel ratio sensor 70a, and the concentration of oxygen in the exhaust gas discharged from the fourth to sixth cylinders of the engine 80, on the other side thereof, can be detected by the second air-fuel ratio sensor 70b. Thus, the oxygen concentrations in the exhaust gases discharged from the cylinders on one side of the engine 80 and from the cylinders on the other side of the engine 80 can be individually detected, thereby attaining higher-precision air-fuel ratio control. Further, since the first and second air-fuel ratio sensors 70a and 70b are mounted so as to be inclined upwardly and toward the rear of the vehicle, the amount of inward projection of each sensor can be reduced.

As apparent from the above-mentioned illustrative embodiments, the present invention is applicable to various types of multi-cylinder engines such as a straight engine, a horizontally opposed engine, and a V-engine.

While a working example of the present invention has been described above, the present invention is not limited to the working example described above, but various design alterations may be carried out without departing from the present invention as set forth in the claims.

What is claimed is:

1. In a motorcycle of the type having a multi-cylinder engine and an exhaust system comprising a separate exhaust pipe extending from each respective cylinder of the engine, the improvement comprising
   improved mounting structure in said exhaust system for supportively receiving an air-fuel ratio sensor used for linearly detecting a concentration of oxygen in an exhaust gas of the motorcycle during operation thereof,
   the air-fuel ratio sensor comprising an element whose output voltage changes in proportion to the oxygen concentration in an exhaust stream,
   wherein the exhaust pipes are joined together at a hourglass-shaped convergent connector having a minimum width portion, wherein said fuel-air ratio sensor is mounted substantially centrally on the convergent connector,
   wherein said convergent connector comprises a connector body having an inclined surface, and wherein the air-fuel ratio sensor is mounted on the inclined surface of said convergent connector so as to be inclined towards a rear of said motorcycle,
   wherein said air-fuel ratio sensor is mounted on the inclined surface so as to be inclined towards a center of the motorcycle in a width direction of the motorcycle; and
   wherein said exhaust system is placed on of a left side and a right side of the motorcycle.

2. The mounting structure according to claim 1, wherein said exhaust system comprises at least one catalytic converter operatively connected to a plurality of said exhaust pipes, and wherein said fuel-air ratio sensor is located upstream of said at least one catalytic converter.

3. The mounting structure according to claim 1, wherein said convergent connector comprises a tubular portion having a side wall with a hole formed therein; wherein said mounting structure further comprises a reinforcing member attached to the side wall of the tubular portion, the reinforcing member comprising a cylindrical collar with a threaded hole formed therein; and wherein the air-fuel ratio sensor has an end cap with male threads thereon which fit in the threaded hole of the cylindrical collar.

4. The mounting structure according to claim 1, wherein said air-fuel ratio sensor is configured and arranged so as to be pointed substantially vertically upwardly when said motorcycle is oriented in an upright configuration.

5. In a motorcycle of the type having a multi-cylinder engine and an exhaust system comprising a separate exhaust pipe extending from each respective cylinder of the engine, the improvement comprising
   an improved mounting structure in said exhaust system for supportively receiving an air-fuel ratio sensor used for linearly detecting a concentration of oxygen in an exhaust gas stream of the motorcycle during operation thereof,
   said improved mounting structure formed in said exhaust system for supportively receiving a plurality of air-fuel ratio sensors, wherein
   selected exhaust pipes are joined together at least two convergent connectors, each of said convergent connectors having a respective longitudinal axis parallel to the longitudinal axis of the motorcycle,
   each of said convergent connectors having a minimum width portion and wherein an air-fuel ratio sensor is mounted on each of said at least two convergent connectors, respectively, at a central location thereof,
   the fuel-air ratio sensor comprising an element whose output voltage changes in proportion to the oxygen concentration,
   wherein each of said convergent connectors comprises a connector body having an inclined surface, and wherein the air-fuel ratio sensor is mounted on the inclined surface of each of said convergent connectors so as to be inclined towards a rear of said motorcycle,
   wherein said air-fuel ratio sensor is mounted on the inclined surface of each of the convergent connectors so as to be inclined towards a center of the motorcycle in a width direction of the motorcycle; and
   wherein said exhaust system is placed on both left and right sides of the motorcycle.

6. The mounting structure of claim 5, wherein the at least two convergent connectors are operatively connected together downstream of the air-fuel ratio sensors, so as to form a single common convergent connector.

7. The mounting structure according to claim 5, wherein said exhaust system comprises at least one catalytic converter operatively connected to a plurality of said exhaust pipes, and wherein said fuel-air ratio sensors are located upstream of said at least one catalytic converter.

8. An exhaust subassembly for a motorcycle having a multi-cylinder engine, said exhaust subassembly comprising:
   a plurality of upstream exhaust pipes including a separate exhaust pipe for placement extending from each respective cylinder of the engine, each of said upstream exhaust pipes having a front end portion and a rear end portion;
   a convergent connector attached to the rear end portions of the upstream exhaust pipes, wherein the upstream exhaust pipes are joined together at the convergent connector, said convergent connector having a minimum width portion;
   a pair of downstream exhaust pipes attached to and extending rearwardly from the convergent connector;
   improved mounting structure for supportively receiving an air-fuel ratio sensor used for linearly detecting a concentration of oxygen in an exhaust gas stream of the motorcycle during operation thereof, and wherein said improved mounting structure comprises a cylindrical collar centrally provided on said convergent connector proximate said minimum width portion thereof, said cylindrical collar having a threaded opening formed therein;

a nut disposed in said threaded opening of the cylindrical collar; and an air-fuel ratio sensor threadably received by said nut disposed in said cylindrical collar, the air-fuel ratio sensor comprising an element whose output voltage changes in proportion to the oxygen concentration, wherein said convergent connector comprises a connector body having an inclined surface having said cylindrical collar formed thereon, and wherein the air-fuel ratio sensor is mounted on the inclined surface of said convergent connector so as to be inclined towards a rear of said motorcycle.

9. The exhaust subassembly of claim 8, further comprising at least one catalytic convener operatively connected to a plurality of said exhaust pipes, and wherein said fuel-air ratio sensor is located upstream of said at least one catalytic converter.

10. The exhaust subassembly of claim 8, wherein said convergent connector comprises said connector body having a substantially funnel-shaped profile having said inclined surface, and wherein the air-fuel ratio sensor is mounted on the inclined surface of said convergent connector so as to be inclined towards the rear of said motorcycle in an installed configuration of said subassembly.

11. The exhaust subassembly of claim 8, wherein the convergent connector comprises a tubular portion having a side wall with a hole formed therein; wherein said mounting structure further comprises a reinforcing member attached to the side wall of the tubular portion, the cylindrical collar forming a part of said reinforcing member; and wherein the air-fuel ratio sensor has an end cap with male threads thereon which fit in the threaded hole of the cylindrical collar.

12. The exhaust subassembly of claim 8, wherein said air-fuel ratio sensor is configured and arranged so as to be pointed substantially vertically upwardly when said motorcycle is oriented in an upright configuration.

13. The exhaust subassembly of claim 8, wherein the subassembly is configured for use with a two-cylinder engine.

14. The exhaust subassembly of claim 8, wherein the subassembly is configured for use with a four-cylinder engine.

15. The exhaust subassembly of claim 8, wherein the subassembly is configured for use with a six-cylinder engine.

16. The exhaust subassembly of claim 8, wherein said cylindrical collar is provided on an upper portion of said convergent connector;

and wherein the air-fuel ratio sensor is threadably attached to said cylindrical collar such that the air-fuel ratio sensor is substantially vertically oriented when said motorcycle is oriented in an upright configuration.

* * * * *